(12) United States Patent
Driever et al.

(10) Patent No.: US 10,846,125 B2
(45) Date of Patent: Nov. 24, 2020

(54) MEMORY ACCESS OPTIMIZATION IN A PROCESSOR COMPLEX

(71) Applicant: International Business Machines Corporation, Armonk, NY (US)

(72) Inventors: Patricia G. Driever, Poughkeepsie, NY (US); Jerry W. Stevens, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/569,016

(22) Filed: Sep. 12, 2019

(65) Prior Publication Data

US 2020/0004574 A1    Jan. 2, 2020

Related U.S. Application Data

(63) Continuation of application No. 15/497,449, filed on Apr. 26, 2017, now Pat. No. 10,572,286.

(51) Int. Cl.
*G06F 9/455* (2018.01)

(52) U.S. Cl.
CPC ............... *G06F 9/45558* (2013.01); *G06F 2009/45583* (2013.01)

(58) Field of Classification Search
CPC .................................................. G06F 9/45558
See application file for complete search history.

(56) References Cited

U.S. PATENT DOCUMENTS

| | | | |
|---|---|---|---|
| 6,933,860 | B1 | 8/2005 | Gehman |
| 7,213,081 | B2 | 5/2007 | Narasimhamurthy et al. |
| 7,917,726 | B2 | 3/2011 | Hummel et al. |
| 8,041,915 | B1 | 10/2011 | Wahlig et al. |
| 8,214,618 | B2 | 7/2012 | Jeong |
| 8,701,115 | B2 | 4/2014 | Bhandari et al. |
| 9,003,223 | B2 | 4/2015 | Ackaret et al. |

(Continued)

OTHER PUBLICATIONS

List of IBM Patents or Patent Applications Treated as Related; (Appendix P), Filed Sep. 24, 2019, 2 pages.

(Continued)

*Primary Examiner* — Charlie Sun
(74) *Attorney, Agent, or Firm* — Cantor Colburn LLP; William Kinnaman

(57) ABSTRACT

An aspect includes memory access optimization in a processor complex. A non-limiting example includes determining one or more offload criteria for offloading memory movement in the processor complex. A memory movement process parameter corresponding to the one or more offload criteria is identified. Movement of a block of memory from a first block location at a first host to a second block location at a second host is scheduled as the memory movement process performed by an offload engine based on determining that the memory movement process parameter exceeds at least one of the offload criteria. The block of memory is moved from the first block location at the first host to the second block location at the second host as the memory movement process performed by the first host based on determining that the memory movement process parameter does not exceed at least one of the offload criteria.

20 Claims, 7 Drawing Sheets

(56) References Cited

U.S. PATENT DOCUMENTS

| | | | |
|---|---|---|---|
| 9,292,451 B2 | 3/2016 | Dong | |
| 9,311,240 B2 | 4/2016 | Dawkins et al. | |
| 2004/0030816 A1 | 2/2004 | Knight et al. | |
| 2004/0205304 A1* | 10/2004 | McKenney | G06F 9/5016 711/148 |
| 2008/0043842 A1* | 2/2008 | Nakaishi | H04N 19/137 375/240.16 |
| 2009/0198832 A1 | 8/2009 | Shah et al. | |
| 2010/0128606 A1 | 5/2010 | Patel et al. | |
| 2011/0060880 A1 | 3/2011 | Hosoda | |
| 2011/0302474 A1 | 12/2011 | Goss et al. | |
| 2012/0150805 A1 | 6/2012 | Pafumi et al. | |
| 2012/0216188 A1 | 8/2012 | Tsirkin | |
| 2015/0256484 A1 | 9/2015 | Cameron | |
| 2016/0342195 A1 | 11/2016 | Karamcheti et al. | |
| 2017/0336976 A1* | 11/2017 | Lesartre | G06F 21/79 |
| 2018/0314447 A1 | 11/2018 | Driever et al. | |
| 2018/0314455 A1 | 11/2018 | Driever et al. | |

OTHER PUBLICATIONS

U.S. Appl. No. 16/578,721, filed Sep. 23, 2019, Entitled: Memory Access of Optimization for an I/O Adapter in a Processor Complex, First Named Inventor: Patricia G. Driever.

List of IBM Patents or Patent Applications Treated as Related; (Appendix P), Filed Sep. 12, 2019, 2 pages.

* cited by examiner

MEMORY ACCESS OPTIMIZATION IN A PROCESSOR COMPLEX

DOMESTIC PRIORITY

This application is a continuation of U.S. patent application Ser. No. 15/497,449, filed Apr. 26, 2017, the disclosure of which is incorporated by reference herein in its entirety.

BACKGROUND

The present invention generally relates to computer memory system access, and more specifically, to memory access optimization in a processor complex.

A processor complex can be formed by physically integrating multiple platforms together in larger physical containers (e.g., blade, chassis and rack systems) as a single larger-scale platform. A processor complex can include tiers of both physical and virtual hosting with different physical distance attributes.

SUMMARY

Embodiments of the present invention are directed to a computer-implemented method for memory access optimization in a processor complex. A non-limiting example of the computer-implemented method includes determining one or more offload criteria for offloading a memory movement process in the processor complex. A memory movement process parameter corresponding to the one or more offload criteria is identified. Movement of a block of memory from a first block location at a first host to a second block location at a second host is scheduled as the memory movement process performed by an offload engine based on determining that the memory movement process parameter exceeds at least one of the offload criteria. The block of memory is moved from the first block location at the first host to the second block location at the second host as the memory movement process performed by the first host based on determining that the memory movement process parameter does not exceed at least one of the offload criteria.

Embodiments of the present invention are directed to a system for memory access optimization in a processor complex. A non-limiting example of the system includes a plurality of logical partitions with a first host and a second host distributed between one or more processors of one or more processing nodes in one or more drawers of the processor complex. The first host is configured to determine one or more offload criteria for offloading a memory movement process in the processor complex and identify a memory movement process parameter corresponding to the one or more offload criteria. The first host is also configured to schedule movement of a block of memory from a first block location at the first host to a second block location at the second host as the memory movement process performed by an offload engine based on determining that the memory movement process parameter exceeds at least one of the offload criteria. The block of memory is moved from the first block location at the first host to the second block location at the second host as the memory movement process performed by the first host based on determining that the memory movement process parameter does not exceed at least one of the offload criteria.

Embodiments of the invention are directed to a computer program product for memory access optimization in a processor complex, the computer program product including a computer readable storage medium having program instructions embodied therewith. In a non-limiting example, the program instructions are executable by processing circuitry to cause the processing circuitry to perform determining one or more offload criteria for offloading a memory movement process in the processor complex and identifying a memory movement process parameter corresponding to the one or more offload criteria. The program instructions are also configured to schedule movement of a block of memory from a first block location at the first host to a second block location at the second host as the memory movement process performed by an offload engine based on determining that the memory movement process parameter exceeds at least one of the offload criteria. The block of memory is moved from the first block location at the first host to the second block location at the second host as the memory movement process performed by the first host based on determining that the memory movement process parameter does not exceed at least one of the offload criteria.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
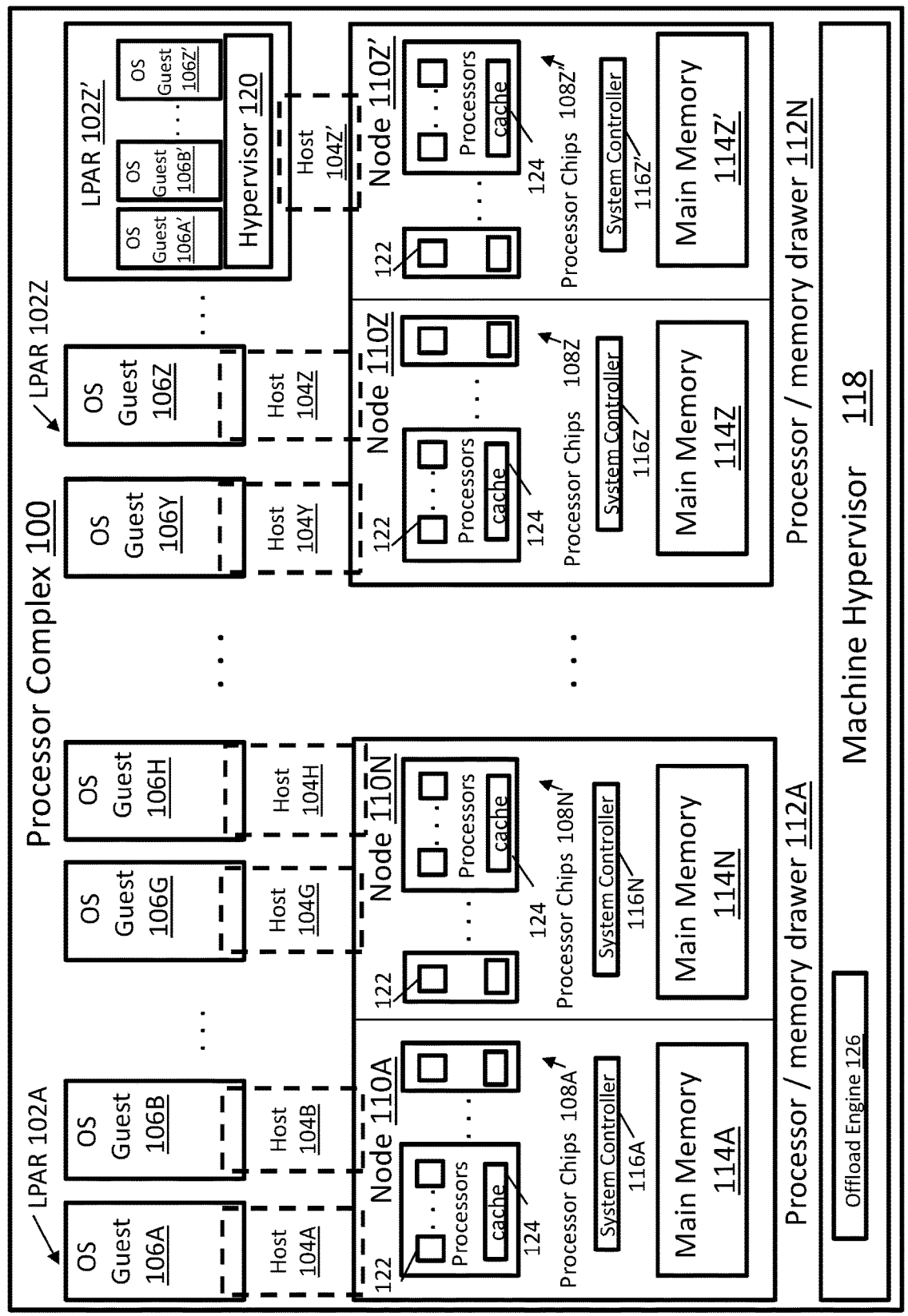
FIG. 1 depicts a processor complex according to one or more embodiments.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, various forms of hosting (virtualizing) multiple instances of operating systems within unique "containers" (i.e., logical partitions) on various physical compute platforms continue to evolve and grow, scaling out and up. This technology is typically referred to as "hypervisor" technology. Growth is occurring vertically (larger images) and horizontally (more images). There is also growth in the number of virtualization solutions provided by hardware, firmware and software products.

As the number of operating system instances that can be hosted on a single platform, such as a processor complex, continues to grow, new challenges are identified with scalability. Some of the scalability issues are related to density and many issues (e.g., bottlenecks) are related to the sheer number of virtual servers on a single physical platform all attempting to communicate with each other. The need to communicate among the various hosts is driven by forming clustered or multi-tiered solutions. This communication bottleneck has generated a need for advanced forms of highly optimized internal platform communications. In this context "internal" means within the same physical compute platform. Tiers of both physical and virtual hosting with different physical distance attributes in a processor complex can result in variable memory access delays and other challenges.

Turning now to an overview of the aspects of the invention, one or more embodiments of the invention address the above-described shortcomings of the prior art by providing shared real memory across multiple hosts of a processor complex. Host software is provided with visibility to a physical memory topology of the processor complex to determine one or more memory system attributes, such as distance, and can expose real-time feedback, such as memory access time and machine cycles to complete the memory access. Some memory access delays can be relatively consistent due to physical separation, memory block access size, and other constraints. Other memory access delays can change dynamically depending on resource allocation, contention and utilization. When it is predicted that direct memory access requests will likely result in extended delays or other degraded performance metrics, embodiments can mitigate the degradation by utilizing alternative memory access techniques, such as asynchronous operations, alternative instructions or offload memory block movement requests to an offload engine that can schedule memory movement between two or more locations in the processor complex. Memory block movement that is determined to be less burdensome, e.g., due to block size and/or average operation performance, can be initiated directly by a host once the destination and other memory credentials are known, for instance, by using direct memory access (DMA) operations.

The above-described aspects of the invention address the shortcomings of the prior art by including a query service that enables hosts (and operating system guests) to learn the location of processor(s) and physical memory of a host. Location information regarding a processor drawer/chip/node and physical memory allocated to a host can be shared with other hosts to support distance determinations. A distance need not be known precisely; rather, a relative separation to support an offload minimum memory block size determination can be sufficient in making offload and/or direct synchronous/asynchronous memory movement decisions. Exchanged memory location information between hosts can be used for calculating the distance to a shared memory location (e.g., relative to a host processor location). Memory access times, such as real-time machine instruction cycle count/operation feedback, can be made available to compare against offload criteria. The offload criteria can establish thresholds for taking mitigation actions. Mitigation actions can include determining whether to use direct memory movement or offload memory movement and/or dynamically adjust the thresholds to reduce the use of direct memory access to balance resource utilization, for example. Technical effects and benefits include selecting a memory movement operation type within a processor complex that is likely to result in the best expected performance to enhance system responsiveness and reduce overall latency.

Turning now to a more detailed description of aspects of the present invention, FIG. 1 depicts an example of a processor complex 100 according to embodiments of the invention. Multiple logical partitions (LPARs) 102A-102Z can be defined to allocate a plurality of processing and memory resources of hosts 104A-104Z to a plurality of operating system (OS) guests 106A-106Z. Each of the hosts 104A-104Z may provision specific processing and memory resources to corresponding OS guests 106A-106Z, and the allocation of resources can change dynamically over a period of time. In the example of FIG. 1, host 104A and host 104B are allocated to processor chips 108A of a node 110A in a drawer 112A. Each of the hosts 104A and 104B may have specific portions of main memory 114A allocated for respective OS guests 106A and 106B with shared access to processor chips 108A and a system controller 116A. The drawer 112A is an example of a physical partition that can group multiple nodes 110A-110N in close physical proximity. OS guests 106G and 106H can access processing and memory resources of node 110N in drawer 112A through respective hosts 104G and 104H, which may include dedicated space in main memory 114N and shared access to processor chips 108N and system controller 116N. Transfers of memory blocks between host 104A and host 104B can be considered a near-distance memory access, as both hosts 104A and 104B are allocated to the same node 110A. Similarly, transfers of memory blocks between host 104G and host 104H can be considered a near-distance memory access, as both hosts 104G and 104H are allocated to the same node 110N. Transfers of memory blocks between nodes 110A and 110N (e.g., between host 104A and 104G/H or between host 104B and 104G/H) can be considered intermediate-distance memory access within the same drawer 112A.

As a further example, drawer 112N within processor complex 100 can share a same machine hypervisor 118 as other drawers, such as drawer 112A, to support shared access and resource allocation throughout the processor complex 100. Drawer 112N includes nodes 110Z and 110Z'. Host 104Y and host 104Z are allocated to processor chips 108Z of node 110Z in drawer 112N. Each of the hosts 104Y and 104Z may have specific portions of main memory 114Z allocated for respective OS guests 106Y and 106Z with shared access to processor chips 108Z and system controller 116Z. Host 104Z' can be allocated to processor chips 108Z' in node 110Z' in drawer 112N with main memory 114Z' and system controller 116Z'. Rather than a single OS guest, LPAR 102Z' can allocate a plurality of second-level guests that share access to host 104Z' through a hypervisor 120, including OS guest 106A' and 106B'-106Z'. Near-distance memory access can be performed between host 104Y and 104Z in node 110Z or between any of OS guest 106A'-106Z' in node 110Z'. A memory access that spans drawers 112A and 112N (e.g., between host 104A/B and host 104Y/Z or between host 104G/H and 104 Y/Z) is an example of a far-distance memory access.

The processor chips 108A-108Z' can each include multiple processors 122 and cache 124. Although a specific configuration is depicted in FIG. 1, it will be understood that any number of drawers, nodes, processor chips, memory systems, hosts, and/or guests can be implemented in embodiments as described herein. Direct move operations may be performed using DMA managed, for example, through one or more of the processor chips 108A-Z' through corresponding hosts 104A-Z'. In conditions where direct memory movement is likely to be less efficient, an offload engine 126 (which may be implemented on a special-purpose processor accessible through the machine hypervisor 118) can be used to schedule memory accesses/movement as further described herein.

When compute platforms provide virtual (logical) internal networks that are provided by some form of direct memory access to a peer host's memory (i.e., shared real memory), memory characteristics can be provided to OS guests 106A-Z'. The underlying machine hardware architecture can define a distance to memory in quantifiable units based on the specific physical machine topology, form factors and other hardware packaging considerations. The architecture that defines the units can be generalized and extendable to potential changes in future physical machine topologies. Distance to memory can be expressed as a relative distance between the physical location of a processor 122 for a user instance (e.g., an OS guest 106A-Z') and/or the location of pinned physical memory (e.g., main memory 114A-Z') within the infrastructure of the processor complex 100. The location of an OS guest 106A-Z' can be based on the location of the physical processor(s) 122 used by a particular OS guest 106A-Z', for instance, a drawer number. In some embodiments, the OS guest 106A-Z' can be viewed as a logical user of shared memory. For instance, an OS guest 106A-Z' can be considered a remote user of shared memory in the sense that a user is external to the instance of the OS guest 106A-Z' owning a host 104A-Z' of actual memory (i.e., the instance that owns and shares a block of main memory 114A-Z').

Figure 2:
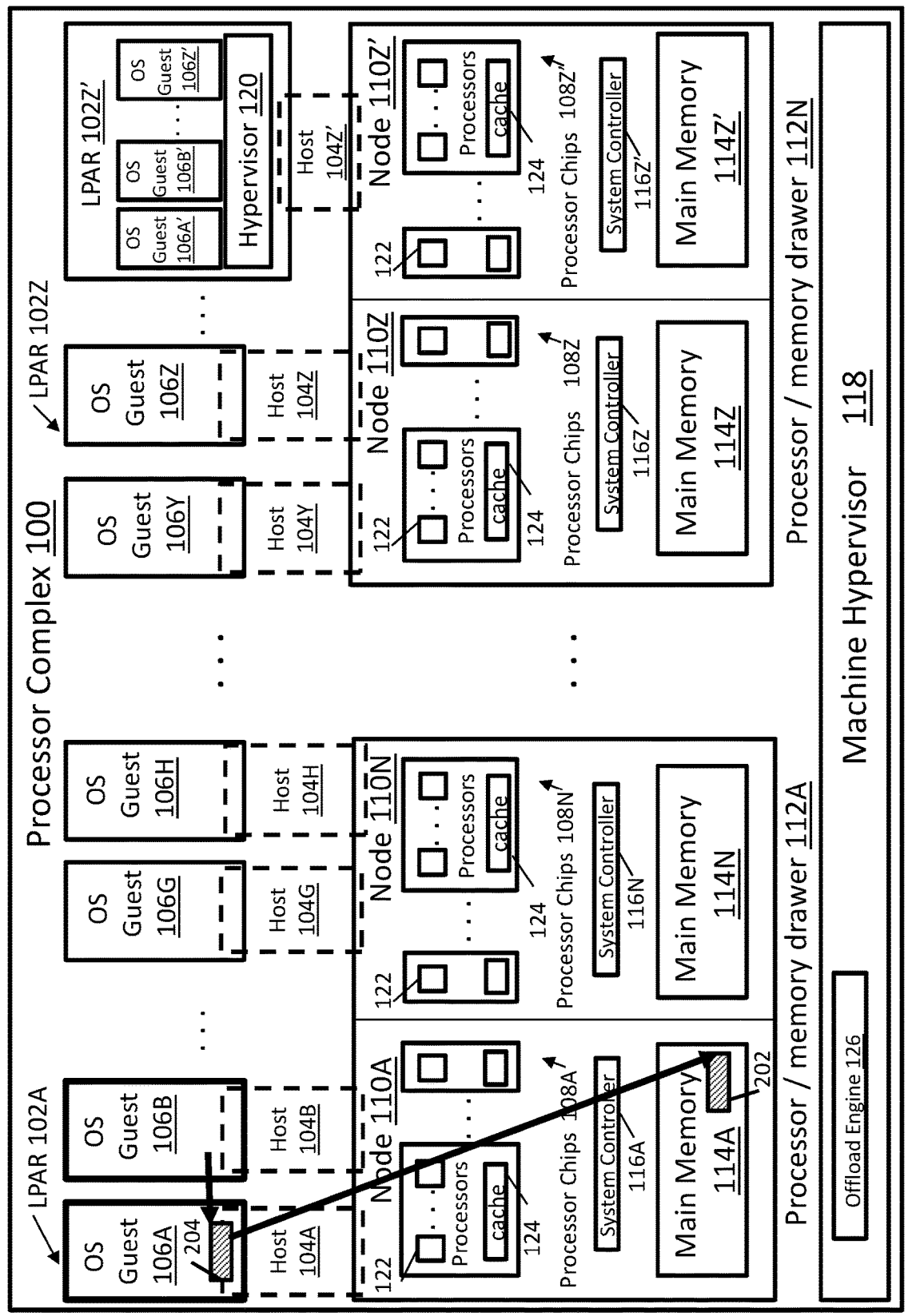
FIG. 2 depicts a near-distance memory access in a processor complex according to one or more embodiments.
Figure 3:
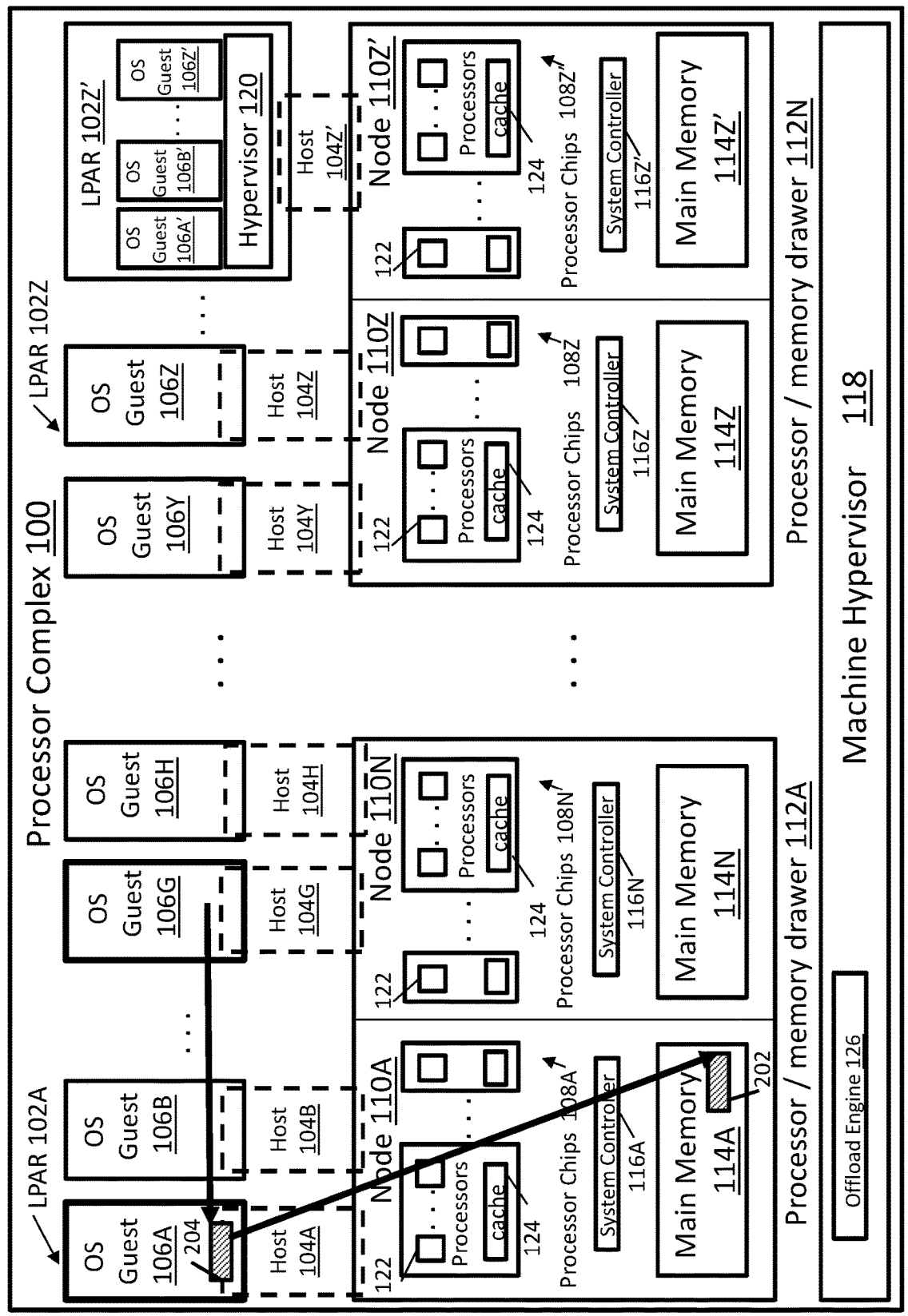
FIG. 3 depicts an intermediate-distance memory access in a processor complex according to one or more embodiments.
Figure 4:
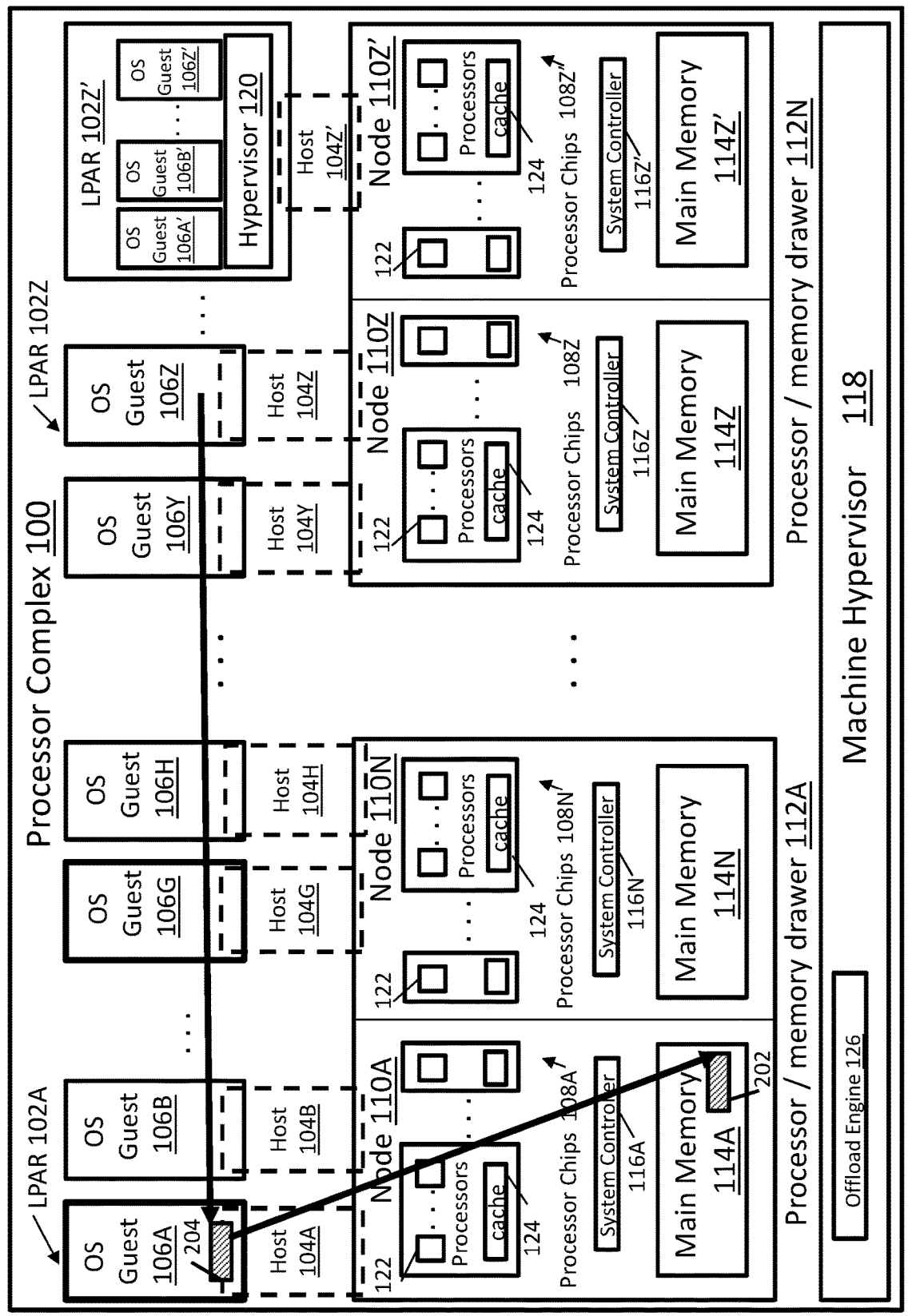
FIG. 4 depicts a far-distance memory access in a processor complex according to one or more embodiments.

When memory is to be exposed (made accessible) to a remote peer host 104A-Z', the memory physical location can be passed to the remote host 104A-Z' (along with any existing memory credentials, such as key or token that is required for direct shared access). The distance to memory attribute can be calculated as follows in the examples of FIGS. 1-4. Host 104A owns memory block 202 (FIGS. 2-4) in main memory 114A. The term "owns" indicates that host 104A allocates, pins, manages and registers the memory with input/output (IO) translation services (e.g., MMIO) of host 104A. Using a query service, host 104A can learn the physical location of memory block 202 (e.g., physical drawer 112A, node 110A, container, etc.). When host 104A is ready to expose (share) memory block 202 with a remote peer host (such as host 104B), host 104A can pass credentials of memory block 202 to the host 104B, which may be performed at the OS guest level between OS guest 106A and 106B, for instance, through memory credentials 204 (FIGS. 2-4). Signaling protocols (such as connection layer control (CLC) messages defined by shared memory communications over remote DMA (SMC-R)) can be used to pass memory credentials 204. In addition to passing the memory credentials 204 for memory block 202 (e.g., a key, token, size, etc.), host 104A can also include the physical machine location of memory block 202. A memory location attribute can be defined by the physical architecture and the signaling protocol of the processor complex 100. Host 104B (the remote host in the example of FIG. 2) can save the location of memory block 202 along with the memory credentials 204.

Host 104B can remotely access memory block 202 (e.g., using a token or key and underlying internal machine/machine hypervisor 118 provided operation) based on location attributes to calculate the distance to memory block 202. Host 104B learns (e.g., query) its physical processor 122 (machine container) location (i.e., physical location of processor(s) 122 of host 104B). Host 104B can compare the two locations of host 104B and memory block 202, and may calculate and save the distance (difference in locations) expressed as an enumerated value (e.g., Near, Intermediate, Far). The difference represents the distance to memory. The definition of distance to memory can be generally expressed as a common logical "distance" factor (metric) that can be further defined by the specific generation of machine architecture and the physical packaging. The values can continue to be used (extended) across subsequent generations of machines (i.e., accounting for evolutions of future machine physical packaging). In some embodiments, three enumerated options (e.g., Near, Intermediate, Far) provide sufficient granularity for memory operation determination. For example, the distance to memory values may be defined as: a. Distance 1=Near; same drawer and node (e.g., host 104B to host 104A in FIG. 2). b. Distance 2=Intermediate; same drawer different node (e.g., host 104G to host 104A in FIG. 3). c. Distance 3=Far; different drawers (e.g., host 104Z to host 104A in FIG. 4).

Each distance can also be augmented with a dynamic access time attribute that accounts for the current average access time (e.g., average move instruction cycle count) for a specific host 104A-Z' for real-time memory access. For instance, the augmented distance values can be expressed as Near 1 or Near 2 for Distance 1, Intermediate 1 or Intermediate 2 for Distance 2, and Far 1 or Far 2 for Distance 3. Near 1 is for the same drawer and node with an average access time <=X. Near 2 is for the same drawer and node with an average access time >X. Intermediate 1 is for the same drawer and a different node with an average access time <=Y. Intermediate 2 is for the same drawer and a different node with an average access time >Y. Far 1 is for different drawers with an average access time <=Z. Far 2 is for different drawers with an average access time >Z. Values of X, Y, and Z are examples of move instruction cycle count thresholds.

In embodiments, the processor complex 100 provides the capability to directly access sharable real memory and can provide a direct memory access capability with a synchronous move instruction (e.g., a zone-to-zone move). The synchronous move instruction may be used for smaller move operations that can complete within a determined time/cost criteria. The synchronous move operation can be interruptible or non-interruptible. When a move size threshold is reached (based on a memory block size to move) then an asynchronous operation/process can be provided for much larger data move operations. In some cases, the processor complex 100 also provides a different type or class of processors that can be used to off-load the machine cycles required for the largest type of data move operations, as embodied in offload engine 126.

The processor complex 100 can provide real-time feedback (when requested) about the cost of the various move operations including, for example, synchronous interruptible operations and asynchronous interruptible operations. As part of instruction completion of synchronous interruptible operations, a total machine cycle count (cycles per instruction) to complete the execution of the synchronous operation can be provided as feedback. Interrupt resolution time can indicate the total time that the synchronous operation is suspended or interrupted (indicates processor contention). Page fault resolution time can indicate total time that the instruction spent resolving page fault operations on the source address (when applicable, when the source address is not pinned, page fault resolution time can indicate a real memory shortage or contention).

Asynchronous interruptible operations can be performed by standard processors 122 and/or specialty offload processors, such as offload engine 126. Upon the completion of the final stage ("stage 2") of the asynchronous move operation, the total time to complete the move/store operation(s) can be provided and may be expressed as a cycle count. For asynchronous operations, attributes of total time and both intervals may be captured (returned and saved). Execution time can indicate the elapsed time required for the execution of an actual (large) move operation. Elapsed time for the asynchronous process to start (time from scheduled to dispatched) can also be tracked. Delays can indicate other resource constraint issues, cache or memory contention, memory nest bottlenecks or priority issues. Interrupt resolution time can indicate the total time that the asynchronous operation was interrupted (indicates processor contention). Page fault resolution time can indicate the total time that the instruction spent resolving page fault operations on the source address (when applicable, when the source address is not pinned, the page fault resolution time can indicate real storage shortages or contention issues).

Once static (distance) and real-time feedback (access time) information is defined and made available, OS guests 106A-Z' can use the information to establish threshold criteria and algorithms for choosing which method would optimize access to shared memory based on, move size, distance and average access time. The OS guests 106A-Z' may also track average memory access time and dynamically adjust the memory access methods to take actions to mitigate any potential negative impact. In severe cases of congestion, direct memory access may be halted and standard communication protocols can be used as a mitigation action. The OS guests 106A-Z' can select the most optimal move operation for accessing shared real memory based on several attributes. For example, the move operation type and parameters can be determined based on the length (size) of the data to be moved, the distance to memory, and/or the average access time to memory (for this size of data move operation). Thresholds can be established related to the cost of move operations based on the length (size) of the data to be moved. In some cases, the thresholds may be set by an administrator (e.g., external configuration settings or policy) based on workload priority that can influence the selected move method. Examples of data move thresholds include: Threshold A (T_A)<=1 k (move size is small); Threshold B (T_B)<=64 k (move size is intermediate, greater than 1 k but less than 64 k); and Threshold C (T_C)>64 k (most size is large).

When different types of move methods are supported (e.g., each having different cost implications) for accessing (moving into) shared real memory (such as memory block 202), then an example move selection can include determining when the move size is small (data move size <=T_A) and using the synchronous move operation to stay on the current processor 122 or processor chip 108A-Z'. When the move size is intermediate (data move size <=T_B), the distance can be examined to select the synchronous move operation when the distance <=Near 1. An asynchronous move can be invoked on the current processor 122 or processor chip 108A-Z' when the distance <=Near 2. Otherwise, an asynchronous move can be scheduled on the offload engine 126 (i.e., memory distance is intermediate or far). When the move size is large (e.g., data move size >T_B), if the distance <=Intermediate 2, an asynchronous move process can be invoked on the current processor 122 or processor chip 108A-Z'; otherwise, an asynchronous move can be scheduled on the offload engine 126 (i.e., memory is large and far).

Embodiments can continuously and dynamically adjust the selected move method (i.e. various operations for direct memory access). The OS guests 106A-Z' can also continuously evaluate the current feedback behavior and cost thresholds along with workload priority (policies) influencing the move operation select. As the cost of the synchronous move operation continues to climb, embodiments can reduce the threshold used to switch to asynchronous operations. For example, instead of switching at data move size X (128 k), the switch to an asynchronous move can be made at size Y (64 k)). Use of the offload engine 126 vs. initiation or completion of the move operation on a standard processor 122 can switch as the delay to schedule and dispatch on the offload engine 126 changes with latency and cost increases.

Embodiments can determine when to switch to use other forms of communications and communications protocols (i.e., when direct memory access itself is becoming a bottleneck, constrained to the point it is now longer viable, then dynamically switch to other (standard) external network communication protocols). For example, embodiments can count/track the number of connections using memory at Far machine distances. For such connections, a total count of the number of Far connections experiencing an average access time >Far 2 can be tracked. When the total count reaches a threshold (e.g., number or percentage of Far connections executing at >Far 2) then use of shared memory can be discontinued (e.g., fallback to standard communications) or creation of new connections at Far distances can be stopped. When the total count drops below a second threshold, then direct memory access can be re-enabled for Far connections. Statistical metrics can be provided that indicate why and when (e.g., frequency) direct memory access is no longer used for Far connections.

Figure 5:
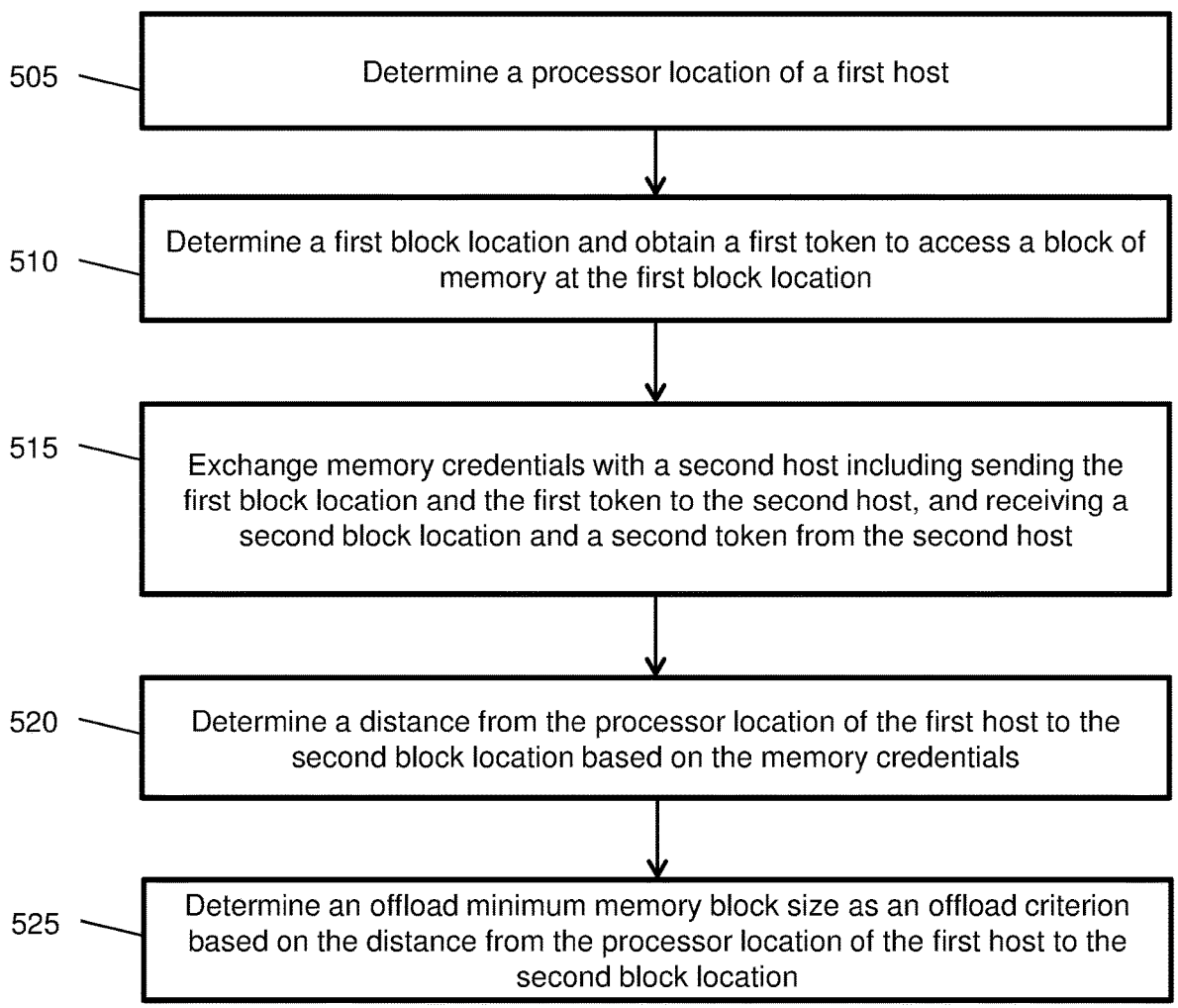
FIG. 5 depicts an example process flow for a distance-to-memory determination according to one or more embodiments.

FIG. 5 depicts a flow diagram of a process 500 for determining a processor to memory distance is generally shown in accordance with an embodiment. The process 500 is described with reference to FIGS. 1-5 and may include additional steps beyond those depicted in FIG. 5.

At block 505, a processor location of the first host (e.g., host 104A) is determined. At block 510, a first block location is determined and a first token to access a block of memory (e.g., memory block 202) at the first block location is determined/obtained.

At block 515, memory credentials 204 are exchanged with the second host (e.g., host 104B-Z'). Exchanging the memory credentials 204 can include sending the first block location and the first token to the second host, and receiving the second block location and a second token to access the second block location from the second host. At block 520, a distance from the processor location of the first host to the second block location is determined based on the memory credentials 204.

At block 525, an offload minimum memory block size is determined as at least one of the offload criteria based on the distance from the processor location of the first host to the second block location. As a further example, the offload minimum memory block size may be set to 180 kilobytes when the distance is Near, set to 128 kilobytes when the distance is Intermediate, and set to 64 kilobytes when the distance is Far.

Figure 6:
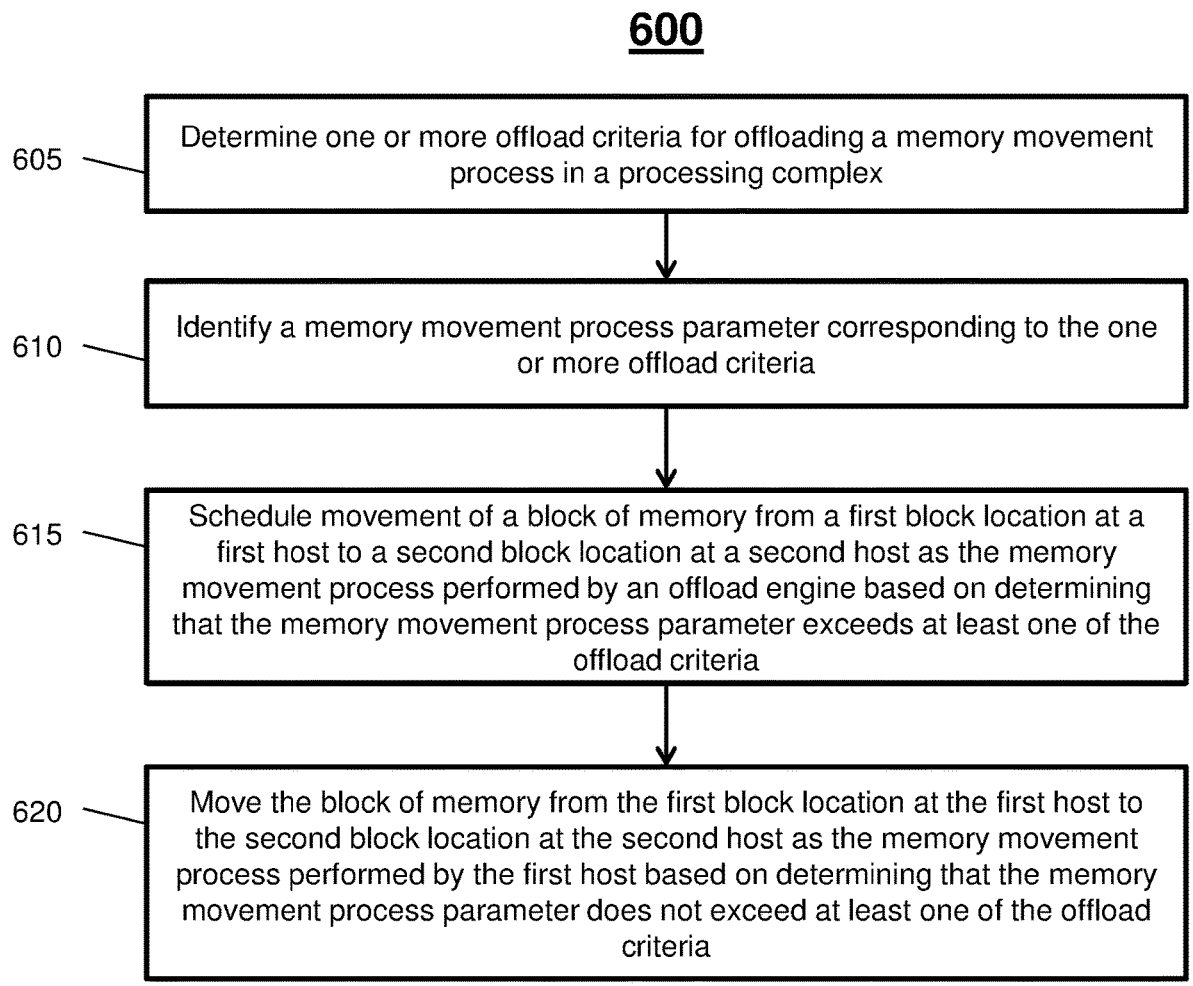
FIG. 6 depicts an example process flow for a memory movement process according to one or more embodiments.

Turning now to FIG. 6, a flow diagram of a process 600 for memory access optimization in a processor complex, such as processor complex 100, is generally shown in accordance with an embodiment. The process 600 is described with reference to FIGS. 1-5 and may include additional steps beyond those depicted in FIG. 6.

At block 605, the first host (e.g., host 104A) determines one or more offload criteria for offloading a memory movement process in the processor complex 100. At block 610, a memory movement process parameter corresponding to the one or more offload criteria is identified, such as a block size of a block of memory (e.g., memory block 202). The offload criteria can be determined based on process 500 of FIG. 5. As a further example, the at least one of the offload criteria can include a move instruction cycle count threshold, and the memory movement process parameter can include an average move instruction cycle count.

At block 615, movement of a block of memory from a first block location at the first host to a second block location at the second host (e.g., host 104B-Z') is scheduled as the memory movement process performed by an offload engine 126 based on determining that the memory movement process parameter exceeds at least one of the offload criteria. At block 620, the block of memory is moved from the first block location at the first host to the second block location at the second host as the memory movement process performed by the first host based on determining that the memory movement process parameter does not exceed at least one of the offload criteria.

Moving the block of memory from the first block location at the first host to the second block location at the second host can be performed by the first host as an asynchronous move operation based on the determining that the memory movement process parameter exceeds one or more intermediate criteria. Moving the block of memory from the first block location at the first host to the second block location at the second host can be performed by the first host as a synchronous move operation based on determining that the memory movement process parameter does not exceed the one or more intermediate criteria. Intermediate criteria can include one or more secondary thresholds, such as a level that is less than levels defined for Far movement (e.g., using offload engine 126) but greater than levels defined for Near movement (e.g., using direct memory access as synchronous operation).

Figure 7:
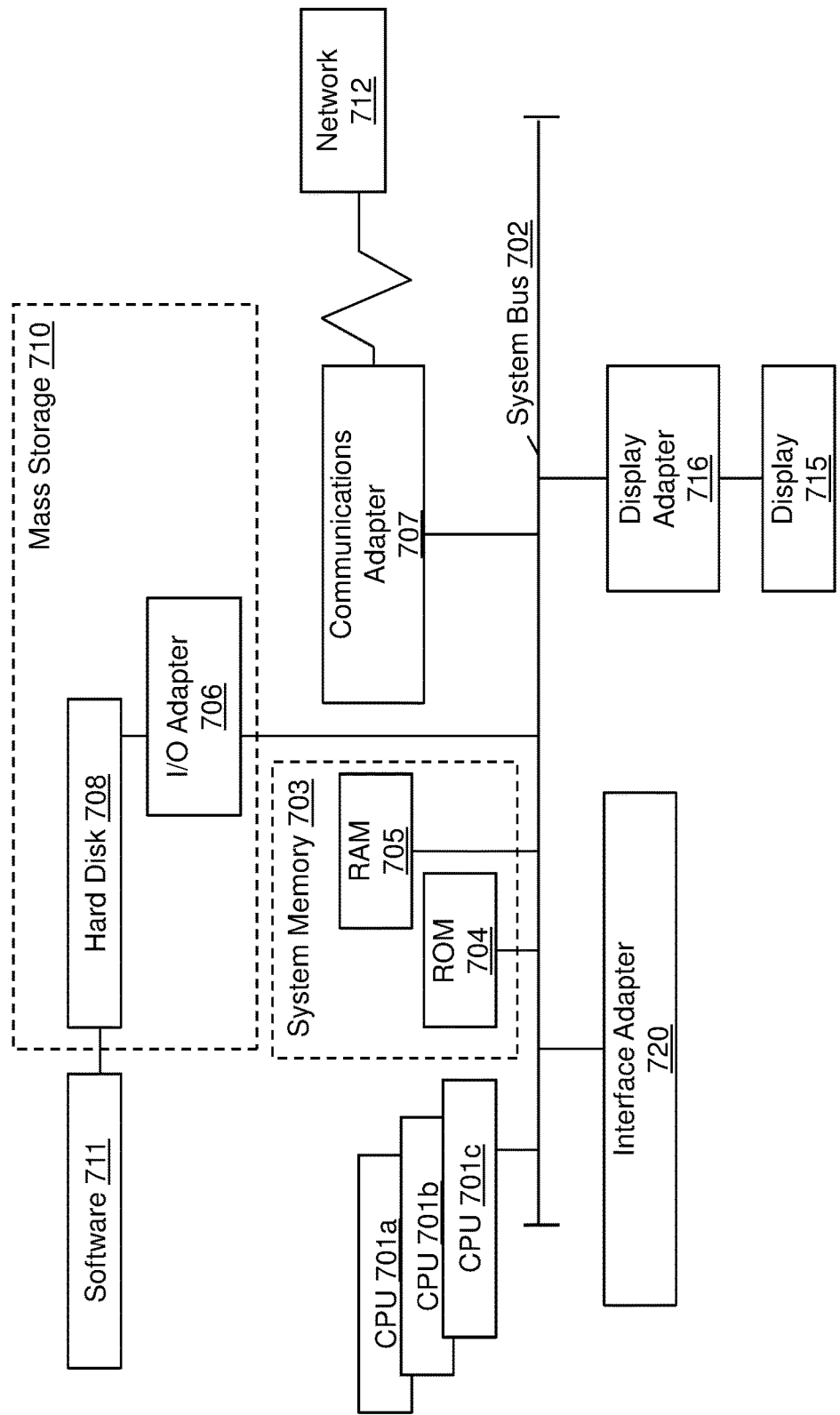
FIG. 7 depicts a processing system in accordance with one or more embodiments.

Referring now to FIG. 7, there is shown an embodiment of a processing system 700 for implementing the teachings herein. In this embodiment, the processing system 700 has one or more central processing units (processors) 701a, 701b, 701c, etc. (collectively or generically referred to as processor(s) 701) that can be an embodiment of the processor chips 108A-Z' or processor 122 of FIG. 1. The processors 701, also referred to as processing circuits/circuitry, are coupled via a system bus 702 to a system memory 703 and various other components (such as system controllers 116A-Z' of FIG. 1). The system memory 703 can include read only memory (ROM) 704 and random access memory (RAM) 705. The ROM 704 is coupled to system bus 702 and may include a basic input/output system (BIOS), which controls certain basic functions of the processing system 700. RAM 705 is read-write memory coupled to system bus 702 for use by the processors 701.

FIG. 7 further depicts an input/output (I/O) adapter 706 and a communications adapter 707 coupled to the system bus 702. I/O adapter 706 may be a small computer system interface (SCSI) adapter that communicates with a hard disk 708 and/or any other similar component. I/O adapter 706 and hard disk 708 are collectively referred to herein as mass storage 710. Software 711 for execution on the processing system 700 may be stored in mass storage 710. The mass storage 710 is an example of a tangible storage medium readable by the processors 701, where the software 711 is stored as instructions for execution by the processors 701 to perform a method, such as the processes 500, 600 of FIGS. 5 and 6. Communications adapter 707 interconnects the system bus 702 with an outside network 712 enabling processing system 700 to communicate with other such systems. A display 715 is connected to system bus 702 via a display adapter 716, which may include a graphics controller to improve the performance of graphics intensive applications and a video controller. In one embodiment, adapters 706, 707, and 716 may be connected to one or more I/O buses that are connected to the system bus 702 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices can be connected to the system bus 702 via an interface adapter 720 and the display adapter 716. A keyboard, mouse, speaker can be interconnected to the system bus 702 via the interface adapter 720, which may include, for example, a Super I/O chip integrating multiple device adapters into a single integrated circuit.

Thus, as configured in FIG. 7, the processing system 700 includes processing capability in the form of processors 701, and, storage capability including the system memory 703 and the mass storage 710, input means such as keyboard and mouse, and output capability including speaker and the display 715. In one embodiment, a portion of the system memory 703 and the mass storage 710 collectively store an operating system, such as the z/OS or AIX operating system from IBM Corporation, to coordinate the functions of the various components shown in FIG. 7.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for memory access optimization in a processor complex, the computer-implemented method comprising:
    determining one or more offload criteria for offloading a memory movement process in the processor complex;
    identifying a memory movement process parameter corresponding to the one or more offload criteria;
    determining a processor location of a first host;
    exchanging a plurality of memory credentials with a second host;
    determining a distance from the processor location of the first host to the second block location based on the memory credentials;
    scheduling movement of a block of memory from a first block location at the first host to a second block location at the second host as the memory movement process performed by an offload engine based on determining that the memory movement process parameter exceeds at least one of the offload criteria, wherein the at least one of the offload criteria comprises an offload minimum memory block size, and the memory movement process parameter comprises a block size of the block of memory;
    determining the offload minimum memory block size as at least one of the offload criteria based on the distance from the processor location of the first host to the second block location; and
    moving the block of memory from the first block location at the first host to the second block location at the second host as the memory movement process performed by the first host based on determining that the memory movement process parameter does not exceed the at least one of the offload criteria.

2. The computer-implemented method of claim 1, further comprising obtaining a first token to access the block of memory at the first block location, wherein exchanging the memory credentials with the second host comprises sending the first block location and the first token to the second host.

3. The computer-implemented method of claim 2, wherein exchanging the memory credentials with the second host comprises further comprises receiving the second block location and a second token to access the second block location from the second host.

4. The computer-implemented method of claim 1, wherein the processor complex comprises a plurality of drawers, each of the drawers comprising one or more processing nodes, each of the processing nodes comprising a local memory system and one or more processor.

5. The computer-implemented method of claim 4, wherein the distance identifies whether the first host and the second host are located on a same or a different one of the drawers and the processing nodes.

6. The computer-implemented method of claim 1, wherein moving the block of memory from the first block location at the first host to the second block location at the second host is performed by the first host as an asynchronous move operation based on the determining that the memory movement process parameter exceeds one or more intermediate criteria.

7. The computer-implemented method of claim 6, wherein moving the block of memory from the first block location at the first host to the second block location at the second host is performed by the first host as a synchronous move operation based on the determining that the memory movement process parameter does not exceed the one or more intermediate criteria.

8. A system for memory access optimization in a processor complex comprising:
    a plurality of logical partitions comprising a first host and a second host distributed between one or more processors of one or more processing nodes in one or more drawers of the processor complex, wherein the first host is configured to:
        determine one or more offload criteria for offloading a memory movement process in the processor complex;
        identify a memory movement process parameter corresponding to the one or more offload criteria;
        determine a processor location of the first host;
        exchange a plurality of memory credentials with the second host;
        determine a distance from the processor location of the first host to the second block location based on the memory credentials, wherein the distance identifies whether the first host and the second host are located on a same or a different one of the one or more drawers and the one or more processing nodes;
        schedule movement of a block of memory from a first block location at the first host to a second block location at the second host as the memory movement process performed by an offload engine based on determining that the memory movement process parameter exceeds at least one of the offload criteria, wherein the at least one of the offload criteria comprises an offload minimum memory block size, and the memory movement process parameter comprises a block size of the block of memory;

determine the offload minimum memory block size as at least one of the offload criteria based on the distance from the processor location of the first host to the second block location; and move the block of memory from the first block location at the first host to the second block location at the second host as the memory movement process performed by the first host based on determining that the memory movement process parameter does not exceed the at least one of the offload criteria.

9. The system of claim 8, wherein the first host is configured to obtain a first token to access the block of memory at the first block location.

10. The system of claim 9, wherein the exchange of the memory credentials with the second host comprises:

sending the first block location and the first token to the second host; and receiving the second block location and a second token to access the second block location from the second host.

11. The system of claim 8, wherein the at least one of the offload criteria comprises a move instruction cycle count threshold, and the memory movement process parameter comprises an average move instruction cycle count.

12. The system of claim 8, wherein moving the block of memory from the first block location at the first host to the second block location at the second host is performed by the first host as an asynchronous move operation based on the determining that the memory movement process parameter exceeds one or more intermediate criteria.

13. The system of claim 12, wherein moving the block of memory from the first block location at the first host to the second block location at the second host is performed by the first host as a synchronous move operation based on the determining that the memory movement process parameter does not exceed the one or more intermediate criteria.

14. A computer program product for memory access optimization in a processor complex, the computer program product comprising a computer readable storage medium having program instructions embodied therewith, the program instructions executable by processing circuitry to cause the processing circuitry to perform:

determining one or more offload criteria for offloading a memory movement process in the processor complex;

identifying a memory movement process parameter corresponding to the one or more offload criteria;

determining a processor location of a first host;

exchanging a plurality of memory credentials with a second host;

determining a distance from the processor location of the first host to the second block location based on the memory credentials;

scheduling movement of a block of memory from a first block location at the first host to a second block location at the second host as the memory movement process performed by an offload engine based on determining that the memory movement process parameter exceeds at least one of the offload criteria, wherein the at least one of the offload criteria comprises an offload minimum memory block size, and the memory movement process parameter comprises a block size of the block of memory;

determining the offload minimum memory block size as at least one of the offload criteria based on the distance from the processor location of the first host to the second block location; and moving the block of memory from the first block location at the first host to the second block location at the second host as the memory movement process performed by the first host based on determining that the memory movement process parameter does not exceed the at least one of the offload criteria.

15. The computer program product of claim 14, wherein the program instructions executable by processing circuitry further cause the processing circuitry to perform obtaining a first token to access the block of memory at the first block location.

16. The computer program product of claim 15, wherein exchanging the memory credentials with the second host comprises:

sending the first block location and the first token to the second host; and receiving the second block location and a second token to access the second block location from the second host.

17. The computer program product of claim 14, wherein the processor complex comprises a plurality of drawers, each of the drawers comprising one or more processing nodes, each of the processing nodes comprising a local memory system and one or more processors, and the distance identifies whether the first host and the second host are located on a same or a different one of the drawers and the processing nodes.

18. The computer program product of claim 14, wherein the at least one of the offload criteria comprises a move instruction cycle count threshold, and the memory movement process parameter comprises an average move instruction cycle count.

19. The computer program product of claim 14, wherein moving the block of memory from the first block location at the first host to the second block location at the second host is performed by the first host as an asynchronous move operation based on the determining that the memory movement process parameter exceeds one or more intermediate criteria.

20. The computer program product of claim 19, wherein moving the block of memory from the first block location at the first host to the second block location at the second host is performed by the first host as a synchronous move operation based on the determining that the memory movement process parameter does not exceed the one or more intermediate criteria.

* * * * *